United States Patent [19]

Winkelman

[11] 4,451,704
[45] May 29, 1984

[54] SWITCHING SYSTEM AUXILIARY LINE TRANSFER CIRCUIT

[75] Inventor: Max D. Winkelman, Westerville, Ohio

[73] Assignee: Bell Telephone Laboratories, Incorporated, Murray Hill, N.J.

[21] Appl. No.: 364,787

[22] Filed: Apr. 2, 1982

[51] Int. Cl.³ .............. H04M 3/22; H04M 3/50; H04Q 3/64
[52] U.S. Cl. .............. 179/18 F; 179/27 D; 179/27 FG
[58] Field of Search .......... 179/27 D, 27 FH, 27 FG, 179/27 FF, 18 B, 18 BD, 18 BE, 6.17, 18 FA, 18 F

[56] References Cited

U.S. PATENT DOCUMENTS

| | | | |
|---|---|---|---|
| 2,922,847 | 1/1960 | Dunning | 179/27 D |
| 3,111,561 | 11/1963 | Dunning | 179/27 FG |
| 3,482,057 | 12/1969 | Abbott et al. | 179/27 FG |
| 3,557,318 | 1/1971 | Buonsante et al. | 179/39 |
| 3,643,034 | 2/1972 | Burns et al. | 179/27 D |
| 3,721,770 | 3/1973 | Beidel et al. | 179/27 D |

Primary Examiner—Thomas W. Brown
Attorney, Agent, or Firm—D. A. Marshall

[57] ABSTRACT

A line circuit for use in coupling lines with an automatic call distributing switching system. The line circuit (1, 2) responds to a calling customer seizure of a line by connecting the seized line through the switching system (3) to attendant positions 34(P). Apparatus (100, 101, 102, 103) operable by an attendant position connected with the seized line releases the switching system connection and couples the seized line to an announcement circuit (49) to transmit attendant identified information over the seized line to the calling customer. If the calling customer does not disconnect from the announcement circuit after a predetermined time apparatus (104, 105) of the line circuit is enabled to initiate a call connection through the switching system and reconnect the seized line to the attendant positions.

21 Claims, 2 Drawing Figures

SWITCHING SYSTEM AUXILIARY LINE TRANSFER CIRCUIT

TECHNICAL FIELD

This invention relates to switching systems. In particular, it relates to line circuits for use with switching systems arranged to interconnect lines with attendant positions.

BACKGROUND ART

Switching systems have been developed to interconnect customer lines with attendant positions served by the switching systems. These types of switching systems, oftentimes referred to as automatic call distributing switching systems, serve both a number of customer lines and attendant positions and are designed to interconnect the customer lines with the attendant positions so as to distribute calling customers among the attendant positions to balance the attendant workload.

Such switching systems have found widespread use in the field of communications especially in the area of providing information to calling customers. For example, automatic call distributing switching systems are used in the telephone switching network to interconnect local 411 and toll 555-1212 directory assistance calls with attendant positions arranged to provide directory number information to customers. Similarly, such automatic call distributing switching systems may be used in the area of department store ordering and in transportation and entertainment industries to provide reservation information service to calling customers. Frequently, attendants served by an automatic call distributing switching system are required to supply general information such as advertising messages and other routine announcements that tie up the switching system and decreases the traffic handling capacity and overall efficiency of the system. Efficiency of these types of switching systems have been improved by the use of intercept apparatus arranged to intercept an incoming call before it can be connected through the switching system and connecting the call to an announcement circuit arranged to transmit a prerecorded message to the calling customer. If the calling customer does not disconnect within a predetermined time after receipt of the recorded message the call is connected through the switching system to an attendant position in order that an attendant may provide additional information.

Oftentimes, for example, with an automatic call distributing switching system used as a directory assistance system for providing directory information to telephone customers, it is necessary to first connect a line with an attendant position to identify what information is desired by a calling customer. A problem arises in switching systems arranged to intercept calls and connect them to an announcement circuit before the calls are connected through the switching system to an attendant position in that it increases the time required for a customer to access an attendant position and decreases the efficiency of a switching system functioning as an information service system.

Accordingly, a need exists for a switching system arranged to connect a calling customer line with an attendant position which having identified customer requested information may enable the switching system to first connect the line with an announcement circuit and then release the switching system and attendant position so the identified information may be transmitted over the line to the calling customer. A need also exists for an information service switching system having transferred a calling customer line from an attendant position to an announcement circuit that is arranged to reconnect the calling customer line through the information service switching system with another attendant position and release the announcement circuit.

SUMMARY OF THE INVENTION

The foregoing problems are solved and a technical advance is achieved by a switching system having line circuits for connecting a line seized by a calling customer through the switching system with attendant positions and which is arranged to subsequently transfer the seized line connection from the switching system and attendant position to an announcement circuit. The switching system line circuit also comprises apparatus for releasing the announcement circuit and reconnecting the seized line through the switching system with the attendant positions.

In accordance with the invention, a line circuit responsive to a customer seizure of a line for connecting the seized line through a switching system with attendant positions comprises apparatus operable by a connected attendant position for connecting the seized line to an announcement circuit and subsequently releasing the switching system connection with an attendant position. The line circuit also comprises apparatus for releasing the announcement circuit and reconnecting the seized line through the switching system with the attendant positions.

Also in accordance with the invention, a line circuit for transferring a seized line connection through a switching system with an attendant position to an announcement circuit comprises apparatus for protecting the seized line from high voltage transients during the transfer of the seized line to the announcement circuit and the subsequent opening of the switching system connection.

Also in accordance with the invention, a line circuit for transferring a seized line connection through a switching system with an attendant position to an anouncement circuit comprises apparatus for signaling the announcement circuit of operation of the line circuit transfer function. The line circuit further comprises supervisory apparatus coupled across the seized line and announcement circuit connection for monitoring the status of the seized line and for signaling the announcement circuit that an announcement may be transmitted over the transferred connection to the seized line.

Also in accordance with the invention, a switching system line circuit for transferring a seized line connection through a switching system with an attendant position to an announcement circuit comprises apparatus operable by the announcement circuit for initiating another call connection through the switching system with the attendant positions. The line circuit further comprises supervisory and impedance apparatus connected across the initiated call connection for detecting completion of the initiated call connection through the switching system to an attendant position and for terminating the switching system and attendant position connection. In addition, signaling apparatus enabled by operation of the supervisory apparatus is provided for signaling the announcement circuit to release the line circuit apparatus to reconnect the seized line to the initiated switching system and attendant position call connection.

In further accordance with the invention, a line circuit responsive to a seizure of a line for connecting the seized line through a switching system with attendant positions comprises a network of a resistor in series with a parallel combination of a capacitor and diode connected across the line and first relay apparatus normally coupling the seized line with the switching system. The line circuit further comprises second relay apparatus operable by a connected attendant position for operating the first relay apparatus to transfer the seized line connection from the switching system to the announcement circuit. First contact apparatus enabled by operation of the second relay apparatus is provided to connect the parallel capacitor and diode across the seized line connection to protect the seized line against high voltage transients that may occur during transfer of the seized line to the announcement circuit and the release of the switching system connection. First signaling apparatus enabled by operation of the first and second relay apparatus is provided for signaling the announcement circuit of operation of the line circuit transfer function. The line circuit also comprises first supervisory apparatus coupled across the seized line and announcement circuit connection for monitoring the seized line and second signaling apparatus enabled by operation of the first supervisory apparatus for signaling the announcement circuit that an announcement may be transmitted over the transferred connection to the seized line. Third relay apparatus enabled by operation of the first relay apparatus and operable by the announcement circuit is provided for initiating another call connection through the switching system with the attendant positions. Second supervisory apparatus in parallel with impedance apparatus is connected across the initiated call connection by operation of the third relay apparatus to detect completion and terminate the switching system and attendant position initiated call connection. The line circuit further comprises third signaling apparatus enabled by operation of the second supervisory apparatus for signaling the announcement circuit to release the first relay apparatus to reconnect the seized line to the initiated switching system and attendant position call connection.

DESCRIPTION OF THE DRAWING

The foregoing advantages of the present invention, as well as others, will be apparent from the subsequent description of the exemplary embodiment shown in the drawings, in which.

Figure 2:
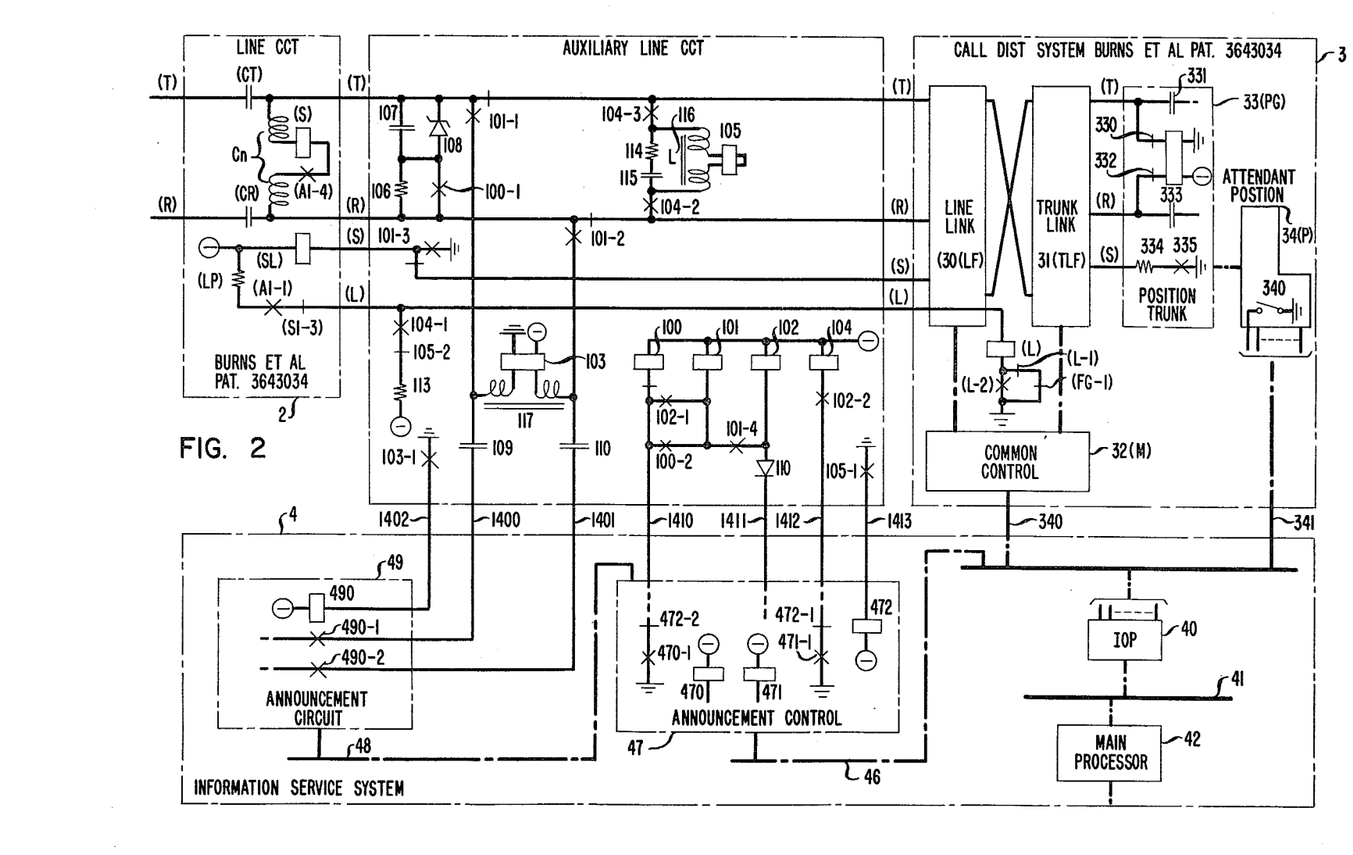
FIG. 2 is a diagram showing schematic details of a switching system line circuit embodying the principles of the invention.

It will be noted that FIG. 2 of the drawing employs a type of notation referred to as "Detached Contact" in which an "X", shown intersecting a conductor, represents a normally open "make" contact of a relay, and a "bar", shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955, publication of *American Institute of Electrical Engineers Transactions, Communications and Electronics,* Volume 74, Pages 505–513.

Figure 1:
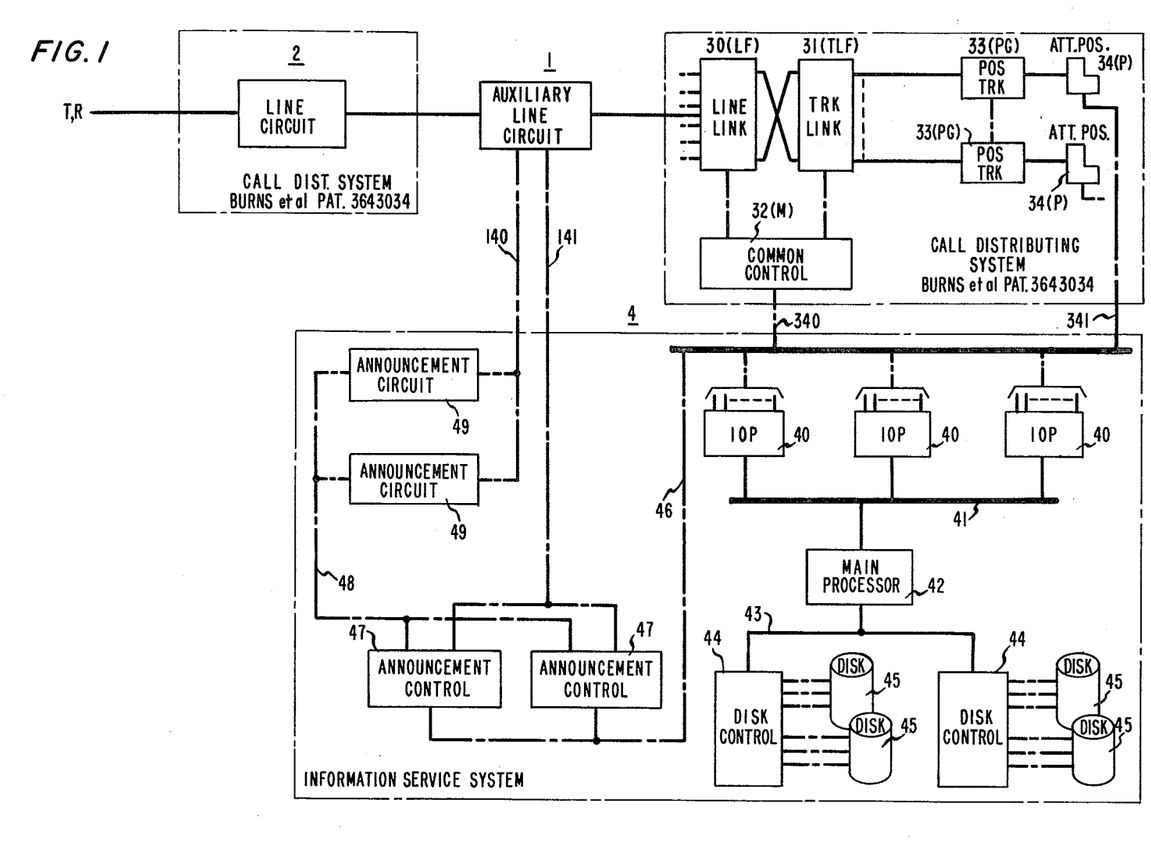
FIG. 1 is essentially a block diagram illustrating the interrelation of the exemplary embodiment of the instant invention.

For the purpose of illustration, FIGS. 1 and 2 of the drawing employ apparatus disclosed in a previously issued patent. In order to facilitate a clear understanding of the instant invention, designations of such apparatus have been retained and are enclosed in parenthesis to facilitate cross reference with the patent from which they were derived.

GENERAL DESCRIPTION

Referring now to FIG. 1 of the drawing, it is intended that auxiliary line circuit 1, shown thereon, be associated with line circuit 2 of a conventional automatic call distributing telephone switching system 3 of the type disclosed in U.S. Pat. No. 3,643,034 issued on Feb. 15, 1972, to T. P. Burns et al. The present invention is not limited for use with a telephone switching system of this type but may be advantageously utilized with other types of switching systems. It is further intended that for the purpose of the present embodiment of the invention the above type of switching system be provided with an information service system 4.

Information service system 4 is basically a computer or processor controlled system designed to store information and programmed to respond to attendant inquiries by locating requested information and making it available for use by attendants and calling customers. Switching system 3 may be either closely or remotely located with respect to information system 4 and is connected by data links 340, 341 to input-output processors 40 that are in turn coupled by bus 41 with main processor 42. Main processor 42, which may be any one of a number of well-known general purpose programmed controlled computers, is connected by bus 43 with disk controls 44 arranged to access disks 45 in which is stored a wide variety of information such as customer directory information. Input-output processors 40 are also connected by data links 46 with announcement controls 47 which control announcement circuits 49 in a well-known manner to produce an audio message from information generated by main processor 42 and transmit the audio message over data link 140 to auxiliary line circuit 1.

A calling customer, for example, desiring directory information and having dialed 411, is connected over the telephone switching network with line T,R coupled to line circuit 2 of automatic call distributing switching system 3. Line circuit 2, normally coupled via auxiliary line circuit 1 with line link frames 30(LF) of switching system 3, responds to a calling customer seizure of line T,R by requesting a call connection through switching system 3 with attendant positions 34(P). Common control 32(M) of switching system 3 is enabled by the call request and identifies an idle position trunk 33(PG) and records in a well-known manner the location thereof on trunk link frame 31(TLF). The recorded location information is transmitted by common control 32(M) over data link 340 to an input-output processor 40 of information service system 4. Input-output processor 40 forwards the location information over bus 41 to main processor 42 which responds by controlling an input-output processor 40 to seize the attendant position 34(P) associated with identified position trunk 33(PG) over data link 341 and activate a CRT device to display initial information concerning the incoming call. Common control 32(M) also uses the location information to establish a call connection from auxiliary line circuit 1 through line link 30(LF) and trunk link 31(TLF) over the identified position trunk 33(PG) to associated attendant position 34(P).

An attendant serving attendant position 34(P) connected with seized line T,R responds to verbal information generated by the calling customer by keying query information over data link 341 into information service system 4. Input-output processor 40 transmits the received query information over bus 41 to main processor 42 which is programmed, for example, to locate a requested directory number from the information stored in disk 45. Main processor 42 assembles and transfers the directory number information to an input-output processor 40 which in turn transfers the assembled information over data link 46 to an announcement control 47 and notifies attendant position 34(P), via data link 341, of the transfer.

The attendant notified of the transfer operates attendant position 34(P) to signal information service system 4 to enable auxiliary line circuit 1 to transfer seized line T,R from switching system 3 to announcement circuit 49. Main processor 42, upon receipt of the signal information, directs input-output processor 40 to transfer the signal information over data link 46 to announcement control 47 which signals auxiliary line circuit 1 over data link 140 to start the transfer sequence.

Auxiliary line circuit 1 connects seized line T,R over data link 140 to announcement circuit 49 and subsequently releases the call connection through switching system 3 and position trunk 33(PG) to attendant position 34(P) which is now free to serve other incoming calls. In addition, auxiliary line circuit 1 monitors seized line T,R and signals announcement circuit 49 over data link 140 that an audio announcement of the assembled directory number information may be transmitted over data link 140 to auxiliary line circuit 1 through the transferred connection over seized line T,R to the calling customer.

After the transmitted directory number information has been received the calling customer may disconnect, thereby enabling auxiliary line circuit 1 to release the connection with announcement circuit 49 and return to an idle state to wait another seizure of the now idle line T,R. If after receipt of the transmitted directory number information, the calling customer desires additional information and fails to disconnect, announcement control 47 operates apparatus of auxiliary line circuit 1 to initiate another call connection through switching system 3 with position trunk 33(PG) and attendant position 34(P). Auxiliary line circuit 1 detects completion of initiated call connection to attendant position 34(P) and signals announcement control 47 of information service system 4 to enable auxiliary line circuit 1 to release announcement circuit 49 and reconnect seized line T,R with the initiated call connection established through service system 3 with attendant position 34(P). After requesting additional information, auxiliary line circuit 1 may be operated to again connect seized line T,R with announcement circuit 49 to return the additional information to the calling customer or may respond to disconnect of the calling customer by releasing the reconnect call connection to attendant position 34(P) and returning to the idle state.

In summary, auxiliary line circuit 1 may transfer a call connection established from a seized line T,R through switching system 3 with attendant position 34(P) to announcement circuit 49 to transmit information to a calling customer and reconnect seized line T,R again through switching system 3 with attendant position 34(P) if the calling customer should require additional information.

DETAILED DESCRIPTION

Referring now to FIG. 2 of the drawing, line T,R comprising tip lead (T) and ring lead (R) connected to line circuit 2 and extending therefrom are normally coupled through the break portion of transfer contacts 101-1, 101-2, respectively, of relay 101 to line link 30(LF) of switching system 3. Similarly, sleeve lead (S) via the break portion of transfer contacts 101-3, and start lead (L) of line circuit 2 are normally coupled through auxiliary line circuit 1 with line link 30(LF) and are associated with line T,R.

When a calling customer is connected to or seizes line T,R, line circuit 2 functions in the manner described in the aforementioned patent of Burns et al. and generates a service request by closing make contacts (A1-1). Operation of make contacts (A1-1) applies battery through resistance (LP) and normal break contacts (S1-3) to start lead (L) which results in the operation of line relay (L) located in switching system 3. Operation of line relay (L) requests common control 32(M) to identify an idle position trunk 33(PG) coupled with an associated attendant position 34(P) and record the trunk link 31(TLF) location information thereof.

Input-output processors 40 of information service system 4 scan common control 32(M) of switching system 3 and receive the location information of the identified attendant position 34(P) over data link 340. The received information is processed by main processor 42 which is programmed to control input-output processor 40 to seize the identified attendant position 34(P) over data link 341 and activate the associated CRT to display initial call information to an attendant.

Common control 32(M) having also identified location of seized line T,R on line link 30(LF) proceeds in the well-known manner to establish a connection between the seized line tip (T), ring (R) and sleeve (S) leads on line link 30(LF) through switching system 3 to the corresponding tip (T), ring (R) and sleeve (S) leads of the identified position trunk 33(PG) on trunk link 31(TLF). During establishment of the connection, relay (SL) of line circuit 2 is operated in response to a ground supplied to sleeve lead (S) in a conventional manner under control of common control 32(M). Upon connection with position trunk 33(PG) ground is applied through operated make contacts 335 and resistor 334 to sleeve lead (S) to maintain relay (SL) of line circuit 2 in the operated state. Battery and ground is applied through windings of the supervisory relay and normal break contacts 330, 332 of position trunk 33(PG) over ring (R) and tip (T) leads extended through switching system 3 and auxiliary line circuit 1 to operate relay (S) through operated make contacts (A1-4) of line circuit 2 and thereby indicate completion of the call connection to attendant position 34(P).

The attendant serving attendant position 34(P) connected with seized line T,R responds to questions received from the calling customer by keying query information such as name, address and other data into attendant position 34(P) which is transmitted over data link 341 to information service system 4. After the requested information, such as a directory number, has been identified by main processor 42, the attendant operates key 340 of attendant position 34(P) to have auxiliary line circuit 1 transfer seized line T,R to announcement circuit 49.

Operation of key 340 results in a signal, for example ground, being transmitted over data link 341 to input-output processor 40. Main processor 42 is programmed to respond to receipt of the key signal by directing an input-output processor 40 to apply a signal over data link 46 to operate logic of announcement control 47, herein represented as relay 470, to connect ground to lead 1410. Ground appearing through operated make contacts 470-1 and released normal contacts 472-2 on lead 1410 operates relay 100 of auxiliary line circuit 1 over a path extending through the normal portion of transfer contacts 102-1.

A network comprising resistor 106 in series with a parallel combination of capacitor 107 and zener diode 108 is connected across the line tip (T) and ring (R) leads. Relay 100 in operating closes make contacts 100-1 to connect the parallel combination of capacitor 107 and zener diode 108 directly across leads (T,R) to protect seized line T,R against high voltage transients occurring during the transfer of seized line T,R from switching system 3 to announcement circuit 49. In addition, operation of relay 100 also closes make contacts 100-2 to establish an operate path from ground appearing on lead 1410 through closed make contacts 100-2 to relay 101.

The resulting operation of relay 101 closes the make portion of transfer contacts 101-1, 101-2 to connect leads (T) and (R) of seized line T,R with leads 1400 and 1401, respectively. Transfer contacts 101-1, 101-2 and 101-3 are of a type known as early make contacts wherein operation of the associated relay closes the make portion of the transfer contacts and subsequently opens the break portion. Thus, the make portion of operated transfer contacts 101-1, 101-2 closes to first connect leads (T) and (R), respectively, with leads 1400 and 1401 extending to announcement circuit 49. Subsequently, the break portion of transfer contacts 101-1, 101-2 opens to release the connection of leads (T) and (R) of seized line T,R with line link 30(LF). Relay 101 in operating also closes the make portion of transfer contacts 101-3 to connect ground to sleeve lead (S) to hold operated line circuit relay (SL) and opens the break portion thereof to release the connection of lead (S) with line link 30(LF). The continued operation of relay (SL) holds break contacts (S1-3) open to prevent a reseizure of a connection through switching system 3. Open tip (T), ring (R), sleeve (S) and start (L) leads release the call connection through switching system 3 with attendant position 34(P), thereby freeing both switching system 3 and attendant position 34(P) to serve other calling customers.

Operation of relay 101 also closes make contacts 101-4 to establish a path through previously operated make contacts 100-2 to both operate relay 102 and enable diode 110 to signal announcement control 47 over lead 1411 of operation of the auxiliary line circuit transfer function. Relay 102 closes make contacts 102-2 to prepare an enabling path for later operation of relay 104 and operates transfer contacts 102-1 to open the break portion to release relay 100. The closing of the make portion of transfer contacts 102-1 holds relay 101 operated to ground appearing on lead 1410. Release of relay 100 opens make contacts 100-1 to reconnect the parallel combination of capacitor 107 and zener diode 108 through resistor 106 across leads (T) and (R).

Battery and ground applied through the windings of supervisory relay 103 and inductor 117, through the operated make portion of transfer contacts 101-2, 101-1, over leads (T), (R) through inductor Cn, closed make contacts (A1-4) and relay (S), both operates supervisory relay 103 and maintains relay (S) in the operated state. Supervisory relay 103 is connected across tip (T) and ring (R) leads in auxiliary line circuit 1 to monitor the status of seized line T,R. If the calling customer disconnects at this time, make contacts (A1-4) in line circuit 2 open to release relay (S), thereby leaving supervisory relay 103 in a released state. Information service system 4 responds by operating relay 472 of announcement circuit 1 to restore auxiliary line circuit 1 to the idle state in a manner hereinafter described. Operation of supervisory relay 103 as an indication that the calling customer is still connected to line T,R closes make contacts 103-1 to signal announcement circuit 49 that an audio announcement of directory number information may be transmitted to the calling customer. Operation of make contacts 103-1 connects ground to lead 1402 to operate logic of announcement circuit 49 herein represented as relay 490.

Main processor 42 upon identifying the directory number information transfers the information, via data link 46, announcement control 47 and data link 48 to announcement circuit 49. Relay 490 in operating closes make contacts 490-1, 490-2 to enable announcement circuit 49 to transmit the directory number information over leads 1400, 1401 through capacitors 109, 110 and operated make contacts 101-1, 101-2, over tip (T) and ring (R) leads via line circuit 2 and seized line T,R to the calling customer.

If the calling customer does not disconnect after receipt of the transmitted directory number information as evidenced by the release of supervisory relay 103 and removal of ground from lead 1402, information service system 4 notifies auxiliary line circuit 2 to initiate another call connection through switching system 3 with attendant position 34(P). When the ground remains on lead 1402 after the directory number information has been transmitted to the calling customer thereby indicating that the calling customer has not disconnected, main processor 42 operates logic of announcement control 47 herein represented as relay 471 to start the reconnection sequence. Operation of relay 471 closes make contacts 471-1 to connect ground through released normal contacts 472-1 to lead 1412 previously connected through enabled make contacts 102-2 to the winding of relay 104. The resulting operation of relay 104 closes make contacts 104-1 to apply battery through released normal contacts 105-2 and resistor 113 to start lead (L). In addition, the operation of make contacts 104-2, 104-3 connect a series resistor 114 and capacitor 115 impedance network connected in parallel with inductor 116 and supervisory relay 105 across tip (T) and ring (R) leads extending from auxiliary line circuit 1 to switching system 3.

Battery now appearing on start lead (L) operates line relay (L) to initiate another call connection through switching system 3. Common control 32(M) responds to operation of line relay (L) by locating and identifying an idle position trunk 33(PG) and connecting tip (T), ring (R) and sleeve (S) leads of auxiliary line circuit 1 with corresponding leads of the idle position trunk 33(PG). Information service system 4 having received the identity and location of position trunk 33(PG) over data link 340 responds by activating the CRT of attendant position 34(P) associated with position trunk 33(PG) over data link 341 to display previously transmitted directory number information and inform the attendant that the calling customer desires additional information.

When switching system 3 has established the reconnection between auxiliary line circuit 1 and position trunk 33(PG), battery and ground applied through the windings of relay 330 to ring (R) and tip (T) leads operate supervisory relay 105 which serves to detect completion of the initiated reconnect call connection through switching system 3 to attendant position 34(P). Operation of supervisory relay 105 opens break contacts 105-2 to remove battery from start lead (L) and closes make contacts 105-1 to apply ground to lead 1413 to signal announcement control 47 to reconnect seized line T,R with the initiated call connection established to attendant position 34(P).

Ground appearing on lead 1413 enables logic, herein represented as relay 472, of announcement control 47 to operate break contacts 472-1 and 472-2 to remove ground from leads 1412 and 1410. Removal of the ground results in the release of relays 101, 102 and 104. Release of relay 101 first closes break portions of early make break transfer contacts 101-1, 101-2 and 101-3 to reconnect tip (T), ring (R) and sleeve (S) leads extending from seized line T,R and line circuit 2 with the corresponding tip (T), ring (R) and sleeve (S) leads extending to line link 30(LF). The subsequent opening of the make portion of transfer contacts 101-1, 101-2 and 101-3 operates to disconnect announcement circuit 49 from seized line T,R and to remove holding ground of auxiliary line circuit 1 from sleeve lead (S). Lead (S) is now connected to ground supplied by position trunk 33(PG) through the closed break portion of transfer contacts 101-3. Release of relay 102 releases transfer contacts 102-1 to reconnect relay 100 with lead 1410 and opens make contacts 102-2 to disconnect relay 104 from lead 1412. Relay 104 in releasing opens make contacts 104-1 and removes supervisory relay 105, inductor 116, resistor 114 and capacitor 115 from across tip (T) and ring (R) leads by opening make contacts 104-3, 104-2. Supervisory relay 105 then releases to close break contacts 105-2 and open make contacts 105-1 to remove ground from signaling lead 1413.

Seized line T,R has now been reconnected by auxiliary line circuit 1 through switching system 3 with attendant position 34(P) in order that the calling customer may request additional information from the attendant serving attendant position 34(P). The attendant may reinitiate the auxiliary line circuit transfer function to again connect seized line T,R with announcement circuit 49 so that information service system 4 may transmit the additional information to the calling customer. An attendant may answer the calling customer questions following which the customer disconnect sequence results in the opening of line circuit 2 make contacts (A1-4) to open the tip (T) and ring (R) leads and thereby release the call connection through switching system 3. Similarly, the attendant may initiate a call disconnect by operating attendant position 34(P) to open make contacts 335 of position trunk 33(PG) to remove holding ground from the sleeve (S) lead.

SUMMARY

It is appreciated from the foregoing that the facility, economy and efficiency of switching systems may be substantially enhanced by the provision of apparatus arranged to connect a calling customer with an attendant, transfer the call connection to an announcement circuit to return requested information and reconnect the calling party with an attendant for additional information. It is further obvious from the foregoing that a line circuit arranged to transfer a calling line from a switching system connection with an attendant position to an announcement circuit, release the switching system connection and subsequently reconnect the calling line on another call connection initiated through the switching system with an attendant position enhances the efficiency of the switching system by increasing the number of customer calls that may be handled by the switching system and attendants.

While the apparatus of the invention has been disclosed in an automatic call distributing switching system wherein telephone directory information is returned to a calling customer, it is to be understood that such an embodiment is intended to be illustrative with the principles of the invention and that numerous other arrangements may be devised with those schooled in the art without departing from the spirit and scope of the invention.

For example, the line circuit apparatus may be employed in an automatic call distributing switching system arranged to interconnect calling customers with service order positions of a large department store or with reservation agents of a public transportation system.

What is claimed is:

1. A switching system (3) for interconnecting lines with attendant positions, the switching system associated with an announcement circuit (47, 49) and comprising line circuits (1, 2) coupled to the lines and responsive to a seized one of the lines for connecting the seized line through the switching system with the attendant positions characterized in that said line circuits comprise means (100, 101, 102, 103, 117, 1402) for transferring said seized line from the switching system to the announcement circuit, and means (104, 105, 116, 1412, 1413) for releasing the announcement circuit and reconnecting said seized line through the switching system with the attendant positions.

2. The switching system of claim 1
   characterized in that
   said transferring means comprises
   means (100, 101, 102, 1410, 100-2, 101-1, 101-2, 101-3, 101-4, 102-1) responsive to an attendant position connected with said seized line for first connecting said seized line to the announcement circuit and subsequently opening the connection between said seized line and the switching system to release the switching system connection with the attendant position.

3. The switching system of claim 2
   characterized in that
   said transferring means also comprises
   means (100, 102, 106, 107, 108, 100-1, 101-4, 102-1) enabled by said first connecting and opening means for protecting said seized line from high voltage transients during said transfer of said seized line to the announcement circuit and the subsequent opening of the switching system connection.

4. The switching system of claim 3
   characterized in that said first connecting and opening means also comprises means (110, 1411) operable upon first connecting said seized line to the announcement circuit for notifying the announcement circuit of operation of the seized line transfer.

5. The switching system of claim 4
characterized in that
said first connecting and opening means further comprises supervisory means (103, 117) coupled across said seized line and announcement circuit connection for monitoring the status of said seized line, and means (103-1, 1402) enabled by operation of said supervisory means for signaling the announcement circuit that an announcement may be transmitted over the transferred connection to said seized line.

6. The switching system of claim 5
characterized in that
said releasing and reconnecting means comprises
means (104, 1412, 104-1, 104-2, 104-3) enabled by operation of said transferring means and operable by the announcement circuit for initiating a call connection through the switching system with the attendant positions.

7. The switching system of claim 6
characterized in that
said releasing and reconnecting means also comprises
second supervisory means (105, 116) connected by operation of said call connection initiating means across said initiated switching system call connection for detecting completion of the initiated call connection to one of the attendant positions.

8. The switching system of claim 7
characterized in that
said releasing and reconnecting means comprises
means (105-1, 1413) enabled by operation of said second supervisory means for signaling the announcement circuit to enable said first connecting and opening means to connect said seized line with the completed switching system connection initiated to the one attendant position and release the announcement circuit.

9. A line circuit (1, 2) for coupling a line with a switching system (3) associated with an announcement circuit (47, 49) and attendant positions, said line circuit comprising
means responsive to a seizure of the line for connecting said seized line through the switching system with the attendant positions
characterized in that
said line circuit further comprises
means (100, 101, 102, 103, 117, 1400, 1401, 1402, 1410, 1411) for connecting said seized line to the announcement circuit and subsequently releasing the switching system connection with the attendant positions, and
means (104, 105, 114, 115, 116, 1412, 1413) for releasing the announcement circuit and reconnecting said seized line through the switching system with the attendant positions.

10. The line circuit of claim 9
characterized in that
said connecting and releasing means comprises first relay means (101, 101-1, 101-2, 101-3) normally coupling said seized line with the switching system and operable for coupling said seized line with the announcement circuit, and second relay means (100, 100-2) operable by a connected attendant position for operating said first relay means to transfer the seized line connection from the switching system to the announcement circuit.

11. The line circuit of claim 10
characterized in that
said connecting and releasing means comprises
first diode means (110) and lead means (1411) enabled by operation of said first and second relay means for signaling the announcement circuit of operation of said line circuit transfer function.

12. The line circuit of claim 11
characterized in that
said connecting and releasing means comprises
first supervisory relay means (103, 117) coupled across said seized line and announcement circuit connection for monitoring the status of said seized line, and
first signaling means (103-1, 1402) enabled by said first supervisory relay means for signaling the announcement circuit that an announcement may be transmitted over the transferred connection to said seized line.

13. The line circuit of claim 12
characterized in that
said releasing and reconnecting means comprises
third relay means (104, 104-1, 104-2, 104-3, 1412) enabled by operation of said first relay means and operable by the announcement circuit for initiating a call connection through the switching system with the attendant positions.

14. The line circuit of claim 13
characterized in that
said releasing and reconnecting means comprises
second supervisory relay means (105, 116) connected by operation of said third relay means across said initiated call connection for detecting completion of said initiated call connection through the switching system to one of the attendant positions, and
impedance means (114, 115) connected in parallel with said second supervisory relay means for terminating said initiated switching system and attendant position call connection.

15. The line circuit of claim 14
characterized in that
said releasing and reconnecting means comprises
second signaling means (105-1, 1413) enabled by operation of said second supervisory relay means for signaling the announcement circuit to release said first relay means to reconnect said seized line through said switching system with the attendant positions.

16. The line circuit of claim 15
characterized in that
said line circuit further comprises
a network comprising a resistor (106) in series with a parallel combination of a capacitor (107) and diode (108) connected across the line, and
means (102, 100-1, 102-1) operable by said first and second relay means for connecting said parallel capacitor and diode combination across said seized line to protect said seized line against high voltage transients occurring during transfer of said seized line connection from the switching system to the announcement circuit.

17. A line circuit (1, 2) for coupling a line with a switching system (3) associated with an announcement circuit (47, 49) and attendant positions, said line circuit comprising
  means responsive to a seizure of the line for connecting the line through the switching system with the attendant positions
  characterized in that
  said line circuit further comprises
  a network of a resistor (106) in series with a parallel combination of a capacitor (107) and diode (108) connected across the line,
  first relay means (101, 101-1, 101-2, 101-3) normally coupling said seized line with the switching system and operable for coupling said seized line with the announcement circuit,
  second relay means (100, 102, 100-2) operable by a connected attendant position for operating said first relay means to transfer the seized line connection from the switching system to the announcement circuit,
  first contact means (100-1) enabled by operation of said second relay means for connecting said parallel capacitor and diode across the seized line connection to protect said seized line against high voltage transients occurring during said line circuit transfer function,
  first signaling means (110, 1411) enabled by operation of said first and second relay means for signaling the announcement circuit of operation of said line circuit transfer function,
  first supervisory means (103, 117) coupled across said seized line and announcement circuit connection for monitoring the state of said seized line,
  second signaling means (103-1, 1402) enabled by operation of said first supervisory means for signaling the announcement circuit that an announcement may be transmitted over said transferred connection to said seized line,
  third relay means (104, 104-1) enabled by operation of said second relay means and operable by the announcement circuit for initiating a call connection through the switching system with the attendant positions,
  second supervisory means (105, 116) connected by operation of said third relay means across said initiated call connection for detecting completion of said initiated call connection through the switching system to one of the attendant positions,
  impedance means (114, 115) connected in parallel with said second supervisory means for terminating said initiated switching system and attendant position call connection and
  third signaling means (105-1, 1413) enabled by operation of said second supervisory means for signaling the announcement circuit to release said first and third relay means to connect said seized line to said initiated switching system and attendant position call connection.

18. A line circuit (1, 2) for coupling tip, ring, sleeve and start leads of a line with corresponding tip, ring, sleeve and start leads of a switching system (3) associated with an announcement circuit (47, 49) and attendant position, said line circuit comprising
  means responsive to a seizure of the line for connecting the tip, ring and sleeve leads of the line through the switching system with the attendant position
  characterized in that
  said line circuit further comprises
  a network of a resistance (106) in series with a parallel combination of a capacitor (107) and diode (108) connected across the line tip and ring leads,
  first relay means (101, 101-1, 101-2) normally coupling said seized line tip and ring leads with the switching system tip and ring leads and operable for coupling said seized line tip and ring leads with the announcement circuit,
  second relay means (100, 100-2, 102) operable by the connected attendant position for operating said first relay means to transfer the seized line tip and ring leads from the switching system to the announcement circuit,
  first contact means (101-3) normally connecting said seized line sleeve lead with the switching system sleeve lead and operable by said first relay means for maintaining said seized line in a hold state during connection of said seized line tip and ring leads with the announcement circuit,
  second contact means (100-1) enabled by operation of said second relay means for connecting said parallel capacitor and diode across said seized line tip and ring leads to protect said seized line against high voltage transients occurring during said line circuit transfer function,
  first signaling means (110, 1411) enabled by operation of said first and second relay means for signaling the announcement circuit of operation of said line circuit transfer function,
  first supervisory means (103, 117) coupled across said seized line and announcement circuit tip and ring lead connection for monitoring the status of said seized line,
  second signaling means (103-1, 1402) enabled by operation of said first supervisory means for signaling the announcement circuit that an announcement may be transmitted over said transferred tip and ring lead connection to said seized line,
  third relay means (104, 104-1) enabled by operation of said second relay means and operable by the announcement circuit for connecting battery to said seized line start lead to initiate a call connection through the switching system with the attendant position,
  second supervisory means (105, 116) connected by operation of said third relay means across the switching system tip and ring leads for detecting completion of said initiated call connection through the switching system to the attendant position,
  impedance means (114, 115) connected in parallel with said second supervisory means for terminating said tip and ring leads of said initiated switching system and attendant position call connection, and
  third signaling means (105-1, 1413) enabled by operation of said second supervisory means for signaling the announcement circuit to release said first relay means to reconnect said seized line tip, ring and sleeve leads to the tip, ring and sleeve leads of said switching system.

19. A line circuit (1, 2) for coupling a line with a switching system (3) associated with an announcement circuit (47, 49) and attendant positions, said line circuit comprising
  means responsive to a seizure of the line for connecting said seized line through the switching system with the attendant positions
  characterized in that said line circuit further comprises
a network of a resistor (106) in series with a parallel combination of a capacitor (107) and first diode (108) connected across the line,
a first relay (101) having transfer contacts (101-1, 101-2) with a break portion for coupling said seized line with the switching system and a make portion for coupling said seized line with the announcement circuit,
a second relay (100) operable by an attendant position connected with said seized line and having first make contacts (100-2) for establishing an operate path for said first relay to transfer said seized line from the switching system to the announcement circuit and second make contacts (100-1) for connecting said parallel capacitor and first diode across said seized line to protect said seized line against high voltage transients occurring during said transfer function,
a second diode (110) and lead (1411) enabled by operation of first make contacts (101-4) of said first relay and said first make contacts of said second relay for signaling the announcement circuit of operation of said line circuit transfer function,
a third relay (102) enabled by operation of said first make contacts of said first and second relays and having transfer contact (102-1) with a break portion for releasing said second relay and a make portion for establishing a hold path for said first relay,
first supervisory apparatus (103, 117) coupled across said seized line and announcement circuit connection for monitoring the status of said seized line,
a first signaling path (1402) enabled by operation of make contacts (103-1) of said first supervisory apparatus for signaling the announcement circuit that an announcement may be transmitted over the connection with said seized line,
a fourth relay (104) enabled by make contacts (102-2) of said third relay and operable by the announcement circuit for closing first make contacts (104-1) to enable the line circuit to initiate a call connection through the switching system to the attendant positions,
second supervisory apparatus (105, 116) connected by operation of second make contacts (104-2, 104-3) of said fourth relay across said initiated call connection for detecting completion of said initiated call connection through the switching system to one of the attendant positions,
a series resistor (114) and capacitor (115) impedance network connected in parallel with said second supervisory apparatus for terminating said initiated switching system and attendant position call connection, and
a second signaling path (1413) enabled by operation to make contacts (105-1) of said second supervisory apparatus for signaling the announcement circuit to release said first, third and fourth relays to connect said seized line to said initiated switching system call connection.

20. The line circuit of claim 19
characterized in that
said line circuit further comprises
a supervisory path enabled by operation of other transfer contacts (101-3) of said first relay for maintaining said seized line in a hold state during transfer of the seized line call connection from the switching system to the announcement circuit.

21. A line circuit for coupling a line with a switching system serving attendant positions and an information service system having an announcement circuit,
said line circuit comprising
means responsive to a seizure of said line for connecting said seized line through the switching system with the attendant positions,
means operable by an attendant position connected with said seized line for first connecting said seized line with said information service system announcement circuit and subsequently releasing said seized line connection with said switching system and attendant position,
means enabled by said first connecting and releasing means for signaling said information service system that an announcement may be transmitted over said information service system announcement circuit connection with said seized line, and
means operable by said information service system for releasing said announcement circuit and reconnecting said seized line through the switching system with the attendant positions.

* * * * *